US012701620B2

(12) United States Patent
Lu et al.

(10) Patent No.: US 12,701,620 B2
(45) Date of Patent: Aug. 4, 2026

(54) METHOD AND APPARATUS FOR SWITCHING BETWEEN SOURCE PATH AND TARGET PATH USING RELAY

(71) Applicant: GUANGDONG OPPO MOBILE TELECOMMUNICATIONS CORP., LTD., Dongguan (CN)

(72) Inventors: Qianxi Lu, Dongguan (CN); Bingxue Leng, Dongguan (CN); Boyuan Zhang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 313 days.

(21) Appl. No.: 18/538,114

(22) Filed: Dec. 13, 2023

(65) Prior Publication Data

US 2024/0114566 A1 Apr. 4, 2024

Related U.S. Application Data

(63) Continuation of application No. PCT/CN2021/110299, filed on Aug. 3, 2021.

(51) Int. Cl.
H04W 76/10 (2018.01)
H04W 40/02 (2009.01)
*H04W 88/04* (2009.01)

(52) U.S. Cl.
CPC ........... H04W 76/10 (2018.02); H04W 40/02 (2013.01); *H04W 88/04* (2013.01)

(58) Field of Classification Search
CPC ..... H04W 76/10; H04W 40/02; H04W 88/04; H04W 76/23; H04W 36/033; H04W 92/18
See application file for complete search history.

(56) References Cited

U.S. PATENT DOCUMENTS 11,490,448 B1 * 11/2022 Kuo ....................... H04W 76/27
11,533,673 B1 * 12/2022 Pan ........................ H04W 40/22
11,601,997 B1 * 3/2023 Pan .................... H04B 7/15507
(Continued)

FOREIGN PATENT DOCUMENTS

CN 111684840 A 9/2020
JP 2019186756 A 10/2019

OTHER PUBLICATIONS

First Office Action of the European application No. 21952187.9, issued on Apr. 4, 2025, 14 pages.
(Continued)

*Primary Examiner* — Afshawn M Towfighi
(74) *Attorney, Agent, or Firm* — BAYES PLLC

(57) ABSTRACT

A wireless communication method is provided, which comprises that: a first UE receives a switching command from a source network device, wherein the switching command is used for instructing the first UE to switch from a source path to a target path, the source path being a path between the first UE and the source network device, the target path being a path between the first UE and a target network device, and the source path and/or the target path being a relay path; and the first UE starts, upon being triggered by the switching command or a first message, to send uplink data and/or receive downlink data on the target path, wherein the first message is a message that is sent by a second UE to the first UE, the second UE being a relay UE on the relay path.

20 Claims, 7 Drawing Sheets

(56)                     References Cited

U.S. PATENT DOCUMENTS

| | | | | |
|---|---|---|---|---|
| 2013/0089022 | A1* | 4/2013 | Lu | H04W 36/08 |
| | | | | 370/315 |
| 2014/0073330 | A1* | 3/2014 | Pan | H04W 36/0079 |
| | | | | 455/441 |
| 2021/0144606 | A1 | 5/2021 | Xu | |
| 2022/0377822 | A1* | 11/2022 | Wang | H04W 76/14 |
| 2023/0129388 | A1* | 4/2023 | Tenny | H04W 24/10 |
| | | | | 370/329 |
| 2023/0397081 | A1* | 12/2023 | Wang | H04W 76/25 |
| 2025/0071628 | A1* | 2/2025 | Wu | H04W 36/0058 |

OTHER PUBLICATIONS

Ericsson (Moderator) et al, "New WID on NR Sidelink Relay", 3GPP TSG RAN Meeting #91e RP-210904, Electronic Meeting, Mar. 16-26, 2021, the whole document. 5 pages.

Qualcomm Incorporated: "Service continuity of L2 U2N relay", 3GPP Draft; R2-2104739, 3GPP, Mobile Competence Centre; 650, Route Des Lucioles; F-06921 Sophia-Antipolis Cedex; France vol. RAN WG2, No. E-Conference; May 19, 2021-May 27, 2021, May 11, 2021 (May 11, 2021), XP052006503, p. 1, section 2 Discussion—p. 7, section 2.4 Details on HO from direct to indirect path (intra-gNB only); figures 4.5.4-1, 4.5.4-2; p. 7, section 3 Conclusion—p. 12, section Appendix—2; figures 1, 2.

Intel Corporation: "Service Continuity support for L2 U2N Relaying", 3GPP Draft; R2-2104891, 3rd Generation Partnership Project (3GPP), Mobile Competence Centre; 650, Route Des Lucioles; F-06921 Sophia-Antipolis Cedex; France vol. RAN WG2, No. e-Meeting; May 19, 2021-May 27, 2021, May 11, 2021 (May 11, 2021), XP052006634, the whole document.

Mediatek Inc: "Service Continuity for L2 Relay and L3 Relay", 3GPP Draft; R2-2009125, 3rd Generation Partnership Project (3GPP), Mobilecompetence Centre; 650, Route Des Lucioles; F-06921 Sophia-Antipolis Cedex; France vol. RAN WG2, No. electronic; Nov. 2, 2020-Nov. 13, 2020, Oct. 23, 2020 (Oct. 23, 2020), XP052362179, the whole document.

Futurewei: "Open Issues in Switches between Direct and Indirect Paths", 3GPP Draft; R2-2105029, 3rd Generation Partnership Project (3GPP), Mobile Competence Centre; 650, Route Des Lucioles; F-06921 Sophia-Antipolis Cedex; France, vol. RAN WG2, No. electronic; May 19, 2021-May 27, 2021, May 11, 2021 (May 11, 2021), XP052006748, the whole document.

Supplementary European Search Report in the European application No. 21952187.9, mailed on Jun. 19, 2024. 17 pages.

OPPO. R2-2104894 "Discussion on service continuity in NR sidelink relay", 3GPP tsg_ran\wg2_rl2,May 10, 2021 (May 10, 2021), the whole document, 4 pages.

ZTE et al. R2-2104979 "Consideration on service continuity of SL relay" 3GPP tsg_ran\wg2_rl2, May 11, 2021 (May 11, 2021), entire document, 7 pages.

International Search Report in the international application No. PCT/CN2021/110299, mailed on Apr. 22, 2022, 5 pages with English translation.

English translation of the Written Opinion of the International Search Authority in the international application No. PCT/CN2021/110299, mailed on Apr. 22, 2022, 9 pages with English translation.

* cited by examiner

METHOD AND APPARATUS FOR SWITCHING BETWEEN SOURCE PATH AND TARGET PATH USING RELAY

CROSS-REFERENCE TO RELATED APPLICATION

This is a continuation application of International Patent Application No. PCT/CN2021/110299, filed on Aug. 3, 2021, the content of which is hereby incorporated by reference in its entirety.

BACKGROUND

With development of technologies, the user equipment-to-network relay (UE-NW relay) technology has been introduced in some communication systems to widen network coverage. In such communication systems, UE can be directly connected to a network device, or can be connected to the network device via relay UE. A path in which UE is connected to the network device via relay UE may be referred to as a relay path, and a path in which the UE is directly connected to the network device may be referred to as a direct path.

The UE in a communication system may need to switch from a source path to a target path sometimes. For example, UE may switch from a relay path to a direct path, or switch from a direct path to a relay path, or switch from a relay path to another relay path. In a switching scenario involving a relay path, namely at least one of a source path and a target path is a relay path, how UE performs data transmission is an urgent problem to be solved.

SUMMARY

The disclosure relates to the technical field of communications, and more specifically to a wireless communication method and device.

Provided is a wireless communication method and device, to solve problems of UE in data transmission in a switching scenario involving a relay path.

In a first aspect, provided is a wireless communication method, including that: first user equipment (UE) receives from a source network device a switching command for indicating the first UE to switch from a source path to a target path, herein the source path is a path between the first UE and the source network device, the target path is a path between the first UE and a target network device, and at least one of the source path or the target path is a relay path; and in response to being triggered by the switching command or a first message, the first UE performs at least one of sending uplink data or receiving downlink data on the target path, herein the first message is sent from second UE to the first UE, and the second UE is relay UE on the relay path.

In a second aspect, provided is a wireless communication method, including that: a source network device sends a switching command to first UE, herein the switching command is used for indicating the first UE to switch from a source path to a target path, the source path is a path between the first UE and the source network device, the target path is a path between the first UE and a target network device, at least one of the source path or the target path is a relay path, and the switching command is used for triggering the first UE to start sending uplink data and/or receiving downlink data on the target path.

In a third aspect, provided is a device for wireless communication, herein the device is first UE and includes a first communication unit and a second communication unit. The first communication unit is configured to: receive from a source network device a switching command for indicating the first UE to switch from a source path to a target path, herein the source path is a path between the first UE and the source network device, the target path is a path between the first UE and a target network device, and at least one of the source path or the target path is a relay path. The second communication unit is configured to: in response to being triggered by the switching command or a first message, start performing at least one of sending uplink data or receiving downlink data on the target path, herein the first message is sent from second UE to the first UE, and the second UE is relay UE on the relay path.

DETAILED DESCRIPTION

Technical solutions of the disclosure will be described below in conjunction with accompanying drawings.

Figure 1:
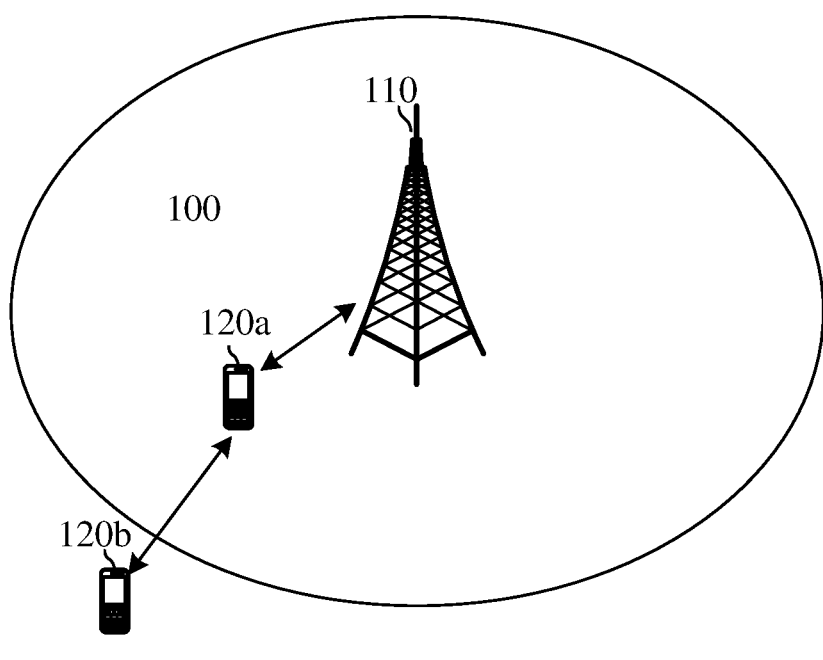
FIG. 1 illustrates a diagram of an example of a wireless communication system applied by embodiments of the disclosure.

FIG. 1 illustrates a wireless communication system 100 applied by embodiments of the disclosure. The wireless communication system 100 may include a network device 110 and UE 120. The network device 110 may be a device communicating with the UE 120. The network device 110 can provide network coverage for a specific geographical area, and can communicate with UE 120 (such as the UE 120*a* in FIG. 1) in the coverage. The UE 120 may access a network (e.g., a wireless network) through the network device 110. Optionally, the wireless communication system 100 may also include other network entities such as a network controller and a mobility management entity, which is not limited in embodiments of the disclosure.

It is to be understood that the technical solution of the embodiments of the disclosure may be applied to various communication systems, such as 5th-generation (5G) system or a new radio (NR) system, a long-term evolution (LTE) system, a frequency division duplex (FDD)-LTE system, and a time division duplex (TDD)-LTE system. The technical solution of disclosure may also be applied to future communication systems such as a 6th-generation communication and a satellite communication.

The UE in embodiments of the disclosure may also be referred to as a terminal device, an access terminal, a subscriber unit, a subscriber station, a mobile radio station, a mobile station (MS), a mobile terminal (MT), a remote station, a remote terminal, a mobile device, a user terminal, a terminal, a wireless communication device, a subscriber agent or a user device. The UE in the embodiments of the disclosure may be a device providing voice and/or data connectivity to a user, and may be used to connect a human, object and a machine, for example a hand-held device and a vehicle-mounted device with a wireless connection function. The UE in the embodiments of the disclosure may be for example a mobile phone, a Pad, a notebook computer, a palmtop, a mobile Internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home. Optionally, the UE may serve as a base station. For example, the UE may serve as a scheduling entity providing sidelink signals between UE in such as vehicle-to-everything (V2X) or device-to-device (D2D). For example, a cell phone and a vehicle communicate with each other using sidelink signals. A cell phone and a smart home device communicate with each other without the need for communication signals being relayed by a base station.

The network device in the embodiments of the disclosure may be a device for communicating with UE. The network device may also be referred to as an access network device or a radio access network device. For example, the network device may be a base station. The network device in the embodiments of the disclosure may be a radio access network (RAN) node or device connecting the UE to a wireless network. A base station can generally cover or be replaced with following: a NodeB, an evolved NodeB (eNB), a next generation NodeB (gNB), a relay station, an access point, a transmitting and receiving point (TRP), a transmitting point (TP), a master eNB (MeNB), a secondary eNB (SeNB), a multi-standard radio (MSR) node, a home eNB, a network controller, an access node, a wireless node, an access point (AP), a transmission node, a transceiving node, a baseband unit (BBU), a remote radio unit (RRU), an active antenna unit (AAU), a remote radio head (RRH), a central unit (CU), a distributed unit (DU), a positioning node, etc. The base station may be a macro base station, a micro base station, a relay node, a donor node or similar, or a combination thereof.

UE may communicate with another UE through a sidelink (SL). Sidelink communication may also be referred to as proximity services (ProSe) communication, unilateral communication, bylink communication, device-to-device (D2D) communication.

The UE-NW relay technology has been introduced in some communication such as an NR communication system. The technology supports remote UE establishing a connection with a network (or a network device) through relay UE (UE-to-network relay UE). The remote UE may be located outside the coverage of the network device (the coverage of the network device is referred to as network coverage below for short). Therefore, the UE-NW relay technology can widen the network coverage.

With FIG. 1 as an example, some UEs (e.g., UE 120*a* in FIG. 1) are located within the coverage of the network device 110, and some UEs (e.g., UE 120*b* in FIG. 1) are located outside the network coverage. The UE 120*b* located outside the network coverage may be referred to as remote UE, and the UE 120*a* within the network coverage may serve as relay UE (or a relay node) for the remote UE 120*b*, so as to establish a connection between the remote UE 120*b* and the network.

FIG. 1 illustrates a scenario where remote UE is connected to a network through relay UE, but the embodiments of the disclosure is not limited thereto. The remote UE may also establish a connection to the network through multiple relay UEs.

Figure 2:
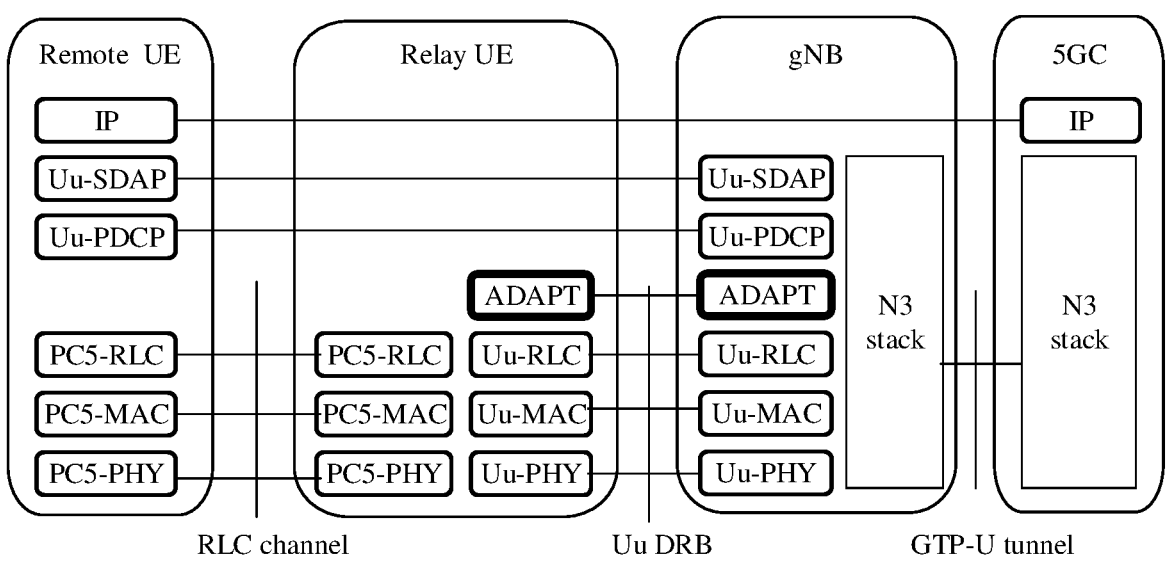
FIG. 2 illustrates a schematic diagram of a protocol stack of a layer 2 relay.

The type of relay UE in the embodiments of the disclosure may be a layer 2 relay. FIG. 2 illustrates a protocol stack of a layer 2 relay. It can be seen from FIG. 2 that both the relay UE and the gNB are provided with an adaptation layer (namely the ADAPT layer in FIG. 2), and the adaptation layer may be used for relaying and forwarding data. The adaptation layer is provided at a Uu interface (or referred to as an air interface) between the relay UE and the eNB, and is provided above an RLC layer. The adaptation layer is used for bearer mapping and remote UE recognition for the Uu interface between the relay UE and the gNB. The adaptation layer may also be referred to as a Uu adaptation layer. Two ends of a Uu-service data adaptation protocol (SDAP) layer/Uu-packet data convergence protocol (PDCP) layer terminate between the remote UE and the gNB. Two ends of each of an RLC layer, a medium access control (MAC) layer and a physical layer (namely the PHY layer in FIG. 2) terminate a link between neighboring nodes (namely, a link between the remote UE and the relay UE, and the link between the relay UE and the gNB).

As mentioned above, the remote UE can establish a connection with the network through multiple relay UEs. If the remote UE establishes a connection with the network through multiple relay UEs, two ends of each of the RLC layer, the MAC layer and the PHY layer illustrated in FIG. 2 may terminal at a link between the remote UE and the relay UE (relay UE neighboring to the remote UE), a link between two neighboring relay UEs, and a link between the relay UE (relay UE neighboring to the gNB) and the gNB.

The adaptation layer of the relay UE and the adaptation layer of the gNB can support a relay service of an uplink and a relay service of a downlink. The adaptation layer of the relay UE and the adaptation layer of the gNB are described below from the view of the uplink and the downlink respectively.

For the uplink, the adaptation layer of the relay UE and the adaptation layer of the gNB can support the uplink bearer mapping between a PC5 RLC channel and a Uu RCL channel. For example, for a relay service of an uplink, for different end-to-end radio bearers of the same remote UE and/or different remote UE, N:1 mapping and data multiplexing can be realized on a Uu RLC channel, herein N is an integer greater than or equal to 1. That is to say, multiple end-to-end radio bearers of remote UE can be mapped to a Uu RLC channel of the relay UE. The radio carriers may be a signaling radio bearer (SRB) and/or a data radio bearer (DRB)

During uplink data transmission, the relay UE may receive uplink data from the remote UE through the PC5 PLC channel corresponding to the remote UE. After receiving the uplink data, the relay UE may map the uplink data for one or more remote UEs to the Uu RLC channel of the relay UE, so as to send the uplink data to the network device.

Similarly, for the downlink, the adaptation layer of the relay UE and the adaptation layer of the gNB can support the downlink bearer mapping between the Uu RCL channel and the PC5 RLC channel. For example, for the relay service of the downlink, the relay UE can receive, through the Uu radio bearer corresponding to the remote UE, downlink data that is sent by the network device to the remote UE. After receiving the downlink data, the relay UE may group and map the downlink data to PC5 RLC channels associated with various remote UE, so as to send the downlink data to the corresponding remote UE.

The form of the RLC channels is not particularly limited in the embodiments of the disclosure. For example, the RLC channel (e.g., a Uu RLC channel and a PC5 RLC channel) may include an RLC entity and a logical channel associated with the RLC entity. The logical channel may for example include a logical channel between an RLC layer and MAC layer.

For UE supporting the UE-NW relay technology, the UE may be directly connected to a network device, or may be indirectly connected to the network device through relay UE. In the embodiments of the disclosure, a path in which the UE is connected to the network device via relay UE is referred to as a relay path (relay link or non-direct path), and a path in which the UE is directly connected to the network device is referred to as a direct path (direct link). During communication, the UE may perform path switching. For example, the UE switches from a relay path to a direct path. For another example, the UE switches from a direct path to a relay path. For yet another example, the UE switches from a relay path to another relay path. In a switching scenario involving a relay path (namely at least one of a source path and a target path is a relay path), how UE performs data transmission is an urgent problem to be solved.

To solve the above problem, the embodiments of the disclosure are described exemplarily in detail in conjunction with FIG. 3 to FIG. 8.

Figure 3:
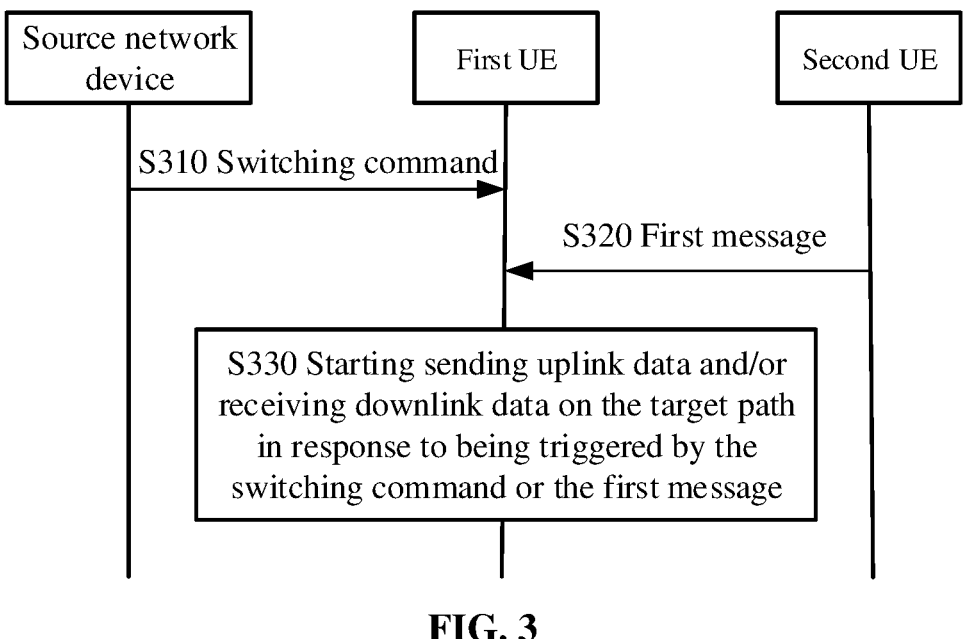
FIG. 3 illustrates a schematic flowchart of a wireless communication method according to an embodiment of the disclosure.

FIG. 3 illustrates a wireless communication method according to an embodiment of the disclosure. The method of FIG. 3 may be applied in a switching scenario involving a relay path. The method of FIG. 3 may be performed by first UE, second UE and a source network device. The first UE is UE switching from a source path to a target path. The source path is a path between the first UE and the source network device, and the target path is a path between the first UE and a target network device. The target network device and the source network device may be the same network device, or may be different network devices. At least one of the source path and the target path is a relay path. For example, the source path is a relay path, and the target path is a direct path. For another example, the source path is a direct path, and the target path is a relay path. For yet another example, both the source path and the target path are relay paths.

As illustrated in FIG. 3, at S310, the source network device sends a switching command to the first UE. The switching command may be used for indicating the first UE to switch from a source path to a target path. Optionally, the switching command is further used for triggering the first UE to start sending uplink data and/or receiving downlink data on the target path.

At S320, the second UE sends a first message to the first UE. The second UE is relay UE on a relay path. In other words, the first message may be a message from relay UE. If the source path is a relay path, the second UE is relay UE on the source path. If the target path is a relay path, the second UE may be relay UE on the target path.

At S330, in response to being triggered by the switching command or the first message, the first UE starts sending uplink data and/or receiving downlink data on the target path. For convenience of description, sending uplink data and/or receiving downlink data on the target path will be referred to as data transmission on the target path for short hereinafter. Data transmitted by the first UE on the target path may be data that has not been successfully transmitted on the source path (e.g., retransmission data), or may be new data (i.e., data that has not been transmitted on the source path once). This is not particularly limited in the disclosure.

In some embodiments, the first UE may start performing data transmission on the target path in response to being triggered by the switching command. If the first UE starts performing data transmission on the target path in response to being triggered by the switching command, the first UE can be switched to the target path as soon as possible, which facilitates reducing switching delay.

In some other embodiments, first UE may start performing data transmission on the target path in response to being triggered by a first message.

For example, if the target path is a relay path, the first message may be a message sent by relay UE on the target path. For another example, if the source path is a relay path, the first message may be a message sent by relay UE on the source path. For yet another example, if both the source path and the target path are relay paths, the first message may be a message sent by relay UE on the source path, or may be a message sent by relay UE on the target path.

The type of the first message is not particularly limited in the embodiments of the disclosure, and can be set according to requirements in such as transmission delay, transmission reliability.

With the target path being a relay path and the second UE being relay UE on the target path as an example, a complete process of establishing a connection between the first UE and the second UE may include firstly establishing a connection between the first UE and the second UE and then configuring the connection. Therefore, the first message may be a message indicating that connection establishment between the first UE and the second UE is completed.

Alternatively, the first message may be a message indicating that connection configuration between the first UE and the second UE is completed. Of course, the first message may simultaneously indicate that the connection establishment between the first UE and the second UE is completed and that the connection configuration between the first UE and the second UE is completed, which is not limited in the disclosure.

Still with the target path being a relay path and the second UE being relay UE on the target path as an example, a complete process of establishing a connection between the second UE and the target network device may include firstly establishing a connection between the second UE and the target network device and then configuring the connection. Therefore, the first message may be a message indicating that connection establishment between the second UE and the target network device is completed. Alternatively, the first message may be a message indicating that connection configuration between the second UE and the target network device is completed.

The connection configuration process between the first UE and the second UE is described with the second UE being relay UE on the target path as an example. The first UE may send a radio resource control (RRC) reconfiguration sidelink request to the second UE. When receiving the RRC reconfiguration request, the second UE may perform RRC reconfiguration. It can be understood that, the RRC reconfiguration herein refers to configuration made for establishing a connection between the second UE and the first UE. After the RRC reconfiguration is completed, the second UE may send an RRC reconfiguration complete sidelink message to the first UE. The first message described above may be an RRC reconfiguration complete message that may indicate that connection configuration between the first UE and the second UE is completed.

It is to be noted that, in the example in which the target path is a relay path, whether the second UE (namely relay UE on the target path) is firstly connected to the target network device or firstly connected to the first UE serving as remote UE is not limited in the embodiments of the disclosure. For example, the second UE may establish a connection with the first UE firstly, and then establish a connection with the target network device. Alternatively, the second UE may also establish a connection with the target network device firstly, and then establish a connection with the first UE. Of Course, the second UE may also establish a connection with the first UE and the target network device simultaneously.

With the event that the second UE establishes a connection with the first UE firstly and then establishes a connection with the target network device as an example, if the first message is selected to be a message indicating that the connection establishment or connection configuration between the first UE and the second UE is completed, the first UE may send data to the second UE before the second UE establishes a connection with the target network device, thereby facilitating reducing switching delay.

Still with the vent that the second UE establishes a connection with the first UE firstly and then establishes a connection with the target network device as an example, if the first message is selected to be a message indicating that the connection establishment or connection configuration between the second UE and the target network device is completed, the first UE may send data to the second UE after the second UE establishes a connection with the target network device, thus avoiding packet loss.

It can be seen that by reasonably selecting the first message, the purposes of reducing path switching delay and/or avoiding packet loss can be realized.

The type of the first message sent by the second UE to the first UE is introduced above with the target path being a relay path and the second UE being relay UE on the target path as an example. The type of the first message sent by the second UE to the first UE is described more specifically below with the source path being a relay path and the second UE being relay UE on the source path as an example.

In some embodiments, the first message may be a message indicating that connection configuration or connection release between the first UE and the second UE is completed.

The connection configuration process between the first UE and the second UE is described with the second UE being relay UE on the source path as an example. The first UE may send an RRC reconfiguration sidelink request to the second UE, and the second UE may perform RRC reconfiguration after receiving the RRC reconfiguration request. It can be understood that, the RRC reconfiguration herein refers to configuration made for releasing a connection between the second UE and the first UE. After performing the RRC reconfiguration, the second UE may send an RRC reconfiguration complete sidelink message to the first UE. The first message described above may be the RRC reconfiguration complete message that may indicate that connection configuration between the first UE and the second UE is completed.

The connection release process between the first UE and the second UE is described still with the second UE being relay UE on the source path as an example. The first UE may send a link release request to the second UE. After receiving the link release request, the second UE may sends a link release accept message to the first UE. The first message described above may be a link release accept message indicating that connection release between the first UE and the second UE is completed.

In some other embodiments, the first message may be a message indicating that the second UE has sent uplink data to the source network device, herein the uplink data is sent from the first UE to the source network device. In other words, the first message may indicate that the second UE has completed sending of the uplink data that is sent from the first UE to the source network device. For example, when the source network devices sends the switching command, the second UE may have not completely transmitted the uplink data (which was sent from the first UE to the source network device) to the source network device. In such a situation, it is required in the embodiments of the disclosure that the second UE triggers the first UE to perform data transmission through the target path after the second UE completed transmission of the uplink data, so as to avoid data packet loss on the source path.

For another example, the first message may be a message indicating that the second UE has sent downlink data (which was sent from the source network device to the first UE) to the first UE. In other words, the first message may indicate that the second UE has completed sending of downlink data that was sent from the source network device to the first UE. For example, when the source network devices sends the switching command, the second UE may have not completely transmitted the downlink data (which was sent from the source network device to the first UE) to the first UE. In such a situation, it is required in the embodiments of the disclosure that the second UE triggers the first UE to perform data transmission through the target path after the second UE completed transmission of the downlink data, so as to avoid data packet loss on the source path.

It is to be understood that, if the first UE starts data transmission on the target path in response to being triggered by the switching command, the method of FIG. 3 may include S310 and S330. If the first UE starts data transmission on the target path in response to being triggered by the first message, the method of FIG. 3 may include S320 and S330.

Before the first UE starts data transmission on the target path, the first UE may also establish a connection with the target device on the target path. The type of the target device is associated with the type of the target path. For example, in the case where the target path is a relay path, the target device is relay UE on the target path. For another example, in the case where the target path is a direct path between the first UE and the target network device, the target device is the target network device. It can be seen from above that the second UE may be relay UE on the source path, or may be relay UE on the target path. In the case where the second UE is relay UE on the target path, the target device is the second UE, and the first UE may establish a connection with the second UE.

The event that the first UE establishes a connection with the target device on the target path may include: the first UE establishes an RLC entity corresponding to the target path. For example, if the target path is a relay path, the first UE may establish a PC5 RLC entity corresponding to the relay path. For another example, if the target path is a direct path, the first UE may establish a Uu RLC entity corresponding to the direct path.

The way in which the first UE processes data on the source path after the source network device sends a switching command to the UE is introduced hereinafter. Optionally, the switching command may be used for indicating the first UE to stop data transmission on the source path, or the switching command may be used for indicating the first UE to continue the data transmission on the source path.

In some embodiments, the switching command may be used for indicating the first UE to stop data transmission on the source path. When receiving the switching command, the first UE may stop data transmission on the source path, for example stop sending of uplink data and/or receiving of downlink data on the source path. For example, the path switching of the first UE may be caused due to poor transmission performance of the source path; therefore, immediately stopping the data transmission on the source path when receiving the switching command can avoid poor data transmission performance caused by continued data transmission on the source path.

In some other embodiments, the switching command may be used for indicating the first UE to continue data transmission on the source path. After receiving the switching command, the first UE may continue data transmission on the source path, for example continue sending of uplink data and/or receiving of downlink data on the source path. For example, before switching to the target path, the first UE needs to firstly establish a target path, but the establishment of the target path may fail (for example, the target path is a relay path, but the first UE cannot find appropriate relay UE). Therefore, in such a situation, the first UE continuing to perform data transmission on the source path can promote the reliability in data transmission.

Optionally, the switching command can be used for indicating the first UE to reserve an RLC entity (corresponding to the source path) in the first UE, so as to realize the purpose that the first UE can continue data transmission on the source path. Alternatively, the switching command may be used for indicating the first UE to release or reconstruct the RLC entity (corresponding to the source path) in the first UE, so as to realize the purpose that the first UE stops data transmission on the source path.

If the first UE continues data transmission on the source path, the first UE may reserve the RLC entity (corresponding to the source path) in the first UE, to enable the first UE to continue the data transmission on the source path. If the first UE stops data transmission on the source path, the first UE may release or reconstruct the RLC entity (corresponding to the source path) in the first UE, to enable the first UE to stop the data transmission on the source path. Releasing the RLC entity of the source path may refer to deleting the RLC entity of the source path. Reconstructing the RLC entity may refer to stopping and resetting all timers in the RLC entity, resetting at least one state variant to an initial value and discarding related data packets (e.g., an RLC service data unit (SDU), an RLC SDU segment and/or an RLC protocol data unit (PDU)). Reserving or reconstructing the RLC entity of the source path is out of the consideration that the first UE may switch from the target path to the source path again. If the first UE switches to the source path again, the first UE can continue to use the reserved or reconstructed RLC entity, which facilitates to reduce switching delay. For example, if the source path is a direct path, the target path is a relay path. The first UE may reserve or reconstruct an RLC entity of the direct path, so that when the first UE switches from the relay path to the direct path again, the first UE can continue to use the RLC entity. For another example, if the source path is a relay path, the target path is a direct path. The first UE can reserve or reconstruct an RLC entity of the relay path, so that when the first UE switches from the direct path to the relay path again, the first UE can continue to use the RLC entity.

With the source path being a direct path and the target path being a relay path as an example, in the embodiments of the disclosure, the process in which the first UE switches from the direct path to the relay path may be referred to as a first switching process, and the process in which the first UE switches from the relay path to the direct path again may be referred to as a second switching process. During the two switching processes, regardless of whether the network device (a cell where the first UE is located) on the direct path in the first switching process is the same as the network device on the direct path in the second switching process, the switching delay can be reduced by reconstructing the RLC entity corresponding to the direct path. If the network devices in the two direct paths in the two switching process are different from each other, the first UE may still reconstruct the RLC entity corresponding to the direct path, so that when the first UE switches from the relay path to the source path again, the first UE can realize path switching by utilizing the reconstructed RLC entity, achieving the purpose of reducing switching delay.

If the first UE continues data transmission on the source path, the first UE may reserve the RLC entity (corresponding to the source path) in the first UE firstly, and release or reconstruct the RLC entity (corresponding to the source path) in the first UE when receiving indication information from the target network device. In particular, the target network device may send indication information to the first UE. The indication information is used for indicating the first UE to release or reconstruct an RLC entity (corresponding to the source path) in the first UE.

Besides the RLC entity, a PDCP entity of the first UE also needs to perform some operations during switching, to enable the first UE to complete path switching. For example, the PDCP entity of the first UE may perform a target operation. The target operation may include at least one of following: PDCP reconstruction, PDCP data restoration, PDCP reconfiguration, or switching a transmission path of PDCP data from a source path to a target path.

For PDCP reconstruction, the PDCP entity before reconstruction may be used to transmit data on the source path, and the PDCP entity after reconstruction may be used to transmit data on the target path. The PDCP data restoration may be used for restoring data of which transmission is interrupted by the switching process. The PDCP reconfiguration may be understood as reconfiguring parameters of the PDCP entity so as to change the path that can be supported by the PDCP entity. For example, the PDCP entity before reconfiguration merely supports data transmission on the source path, and the PDCP entity after reconfiguration supports simultaneous data transmission on the source path and the target path. Supporting simultaneous data transmission on the source path and the target path may include supporting simultaneous transmission of uplink data on the source path and the target path, and/or supporting simultaneous transmission of downlink data on the source path and the target path. It may be understood that after the first UE completes path switching, the PDCP entity of the first UE may further perform PDCP reconfiguration so that the reconfigured PDCP entity merely supports data transmission on the target path.

The particular operation performed by the PDCP entity may be related to data transmission on the source path. If the first UE continues data transmission on the source path after receiving the switching command, the first UE may perform PDCP reconfiguration for the PDCP entity and/or switch the transmission path of PDCP data from the source path to the target path, to enable the first UE to continue data transmission on the source path. The reconfigured PDCP entity may support simultaneous communication on the source path and the target path, so as to ensure that the first UE can perform transmission on the source path and the target path simultaneously. Optionally, after path switching is completed, the PDCP entity of the first UE may switch the transmission path of the PDCP data from the source path to the target path. If the first UE stops data transmission on the source path after receiving the switching command, the first UE may perform PDCP reconstruction for the PDCP entity and/or PDCP data restoration, to enable the first UE to stop data transmission on the source path. For example, if the source network device is the same network device as the target network device, the PDCP entity of the first UE may perform PDCP data restoration. If the source network device is a network device different from the target network device, the PDCP entity of the first UE may perform PDCP reconstruction.

In the embodiments of the disclosure, the sequence in which the following operations are performed is not specifically limited: the first UE starts data transmission on the target path, and the PDCP entity of the first UE performs a target operation. For example, the PDCP entity of the first UE may firstly perform the target operation, and then the first UE starts the data transmission on the target path. With the target operation being PDCP reconfiguration as an example, since the PDCP entity having subjected to the PDCP reconfiguration supports simultaneous data transmission on the source path and the target path, the first UE may start data transmission on the target path after the PDCP reconfiguration. For another example, the first UE may start data transmission on the target path firstly, and then the PDCP entity of the first UE performs the target operation. With the target operation being switching the transmission path of the PDCP data from the source path to the target path as an example, the first UE may switch the transmission path of the PDCP data from the source path to the target path after performing data transmission on the target path.

The condition by which the first UE is triggered to start data transmission on the target path may be the same as or different from the condition by which the PDCP entity of the first UE is triggered to perform a target operation. For example, the first UE may start data transmission on the target path in response to being triggered by a switching command, and the PDCP entity of the first UE may start performing the target operation in response to being triggered by a first message. For another example, the first UE may start data transmission on the target path in response to being triggered by a first message, and the PDCP entity of the first UE may start performing the target operation in response to being triggered by a switching command. For yet another example, the operation that the first UE starts data transmission on the target path and the operation that the PDCP entity of the first UE starts performing a target operation are both triggered by a first message, but the content indicated by the first message in the two operations may be different.

For better understanding, two particular examples are provided below from different views of the switching process performed by the first UE in conjunction with FIG. 4 and FIG. 5. The first UE in FIG. 4 and FIG. 5 may be the first UE as described above.

Figure 4:
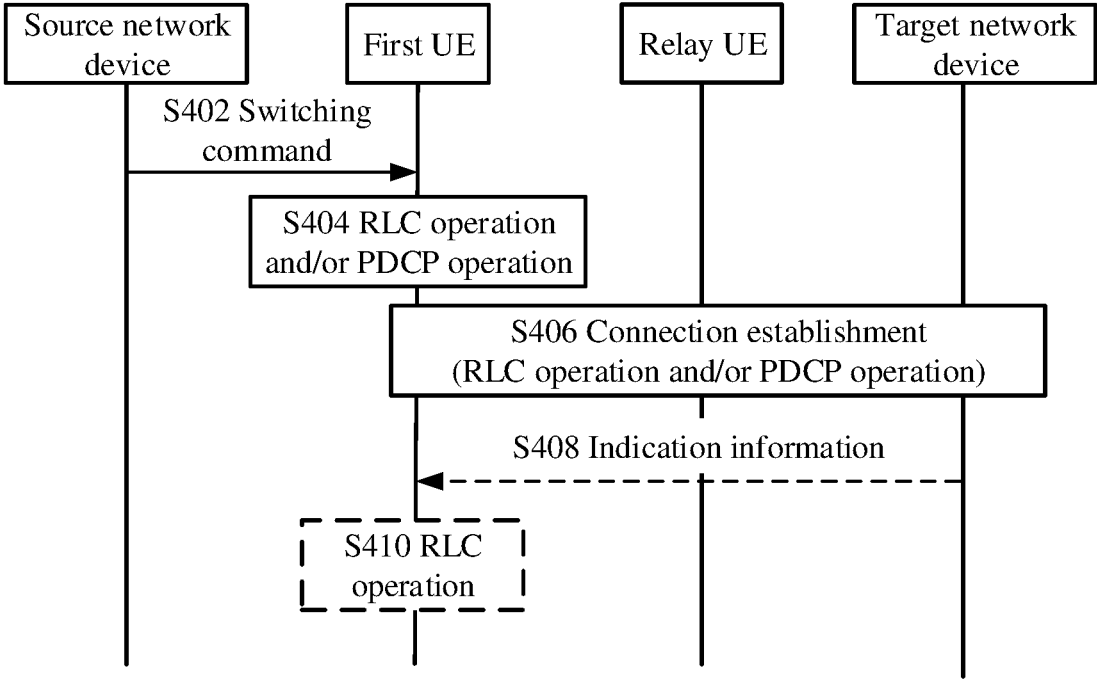
FIG. 4 illustrates a schematic flowchart of a path switching method according to an embodiment of the disclosure.

FIG. 4 illustrates a process that first UE switches from a direct path to a relay path. That is to say, in the method illustrated in FIG. 4, a source path is a direct path, and a target path is a relay path. As illustrated in FIG. 4, at S402, a source network device sends a switching command to the first UE. The switching command may be used for indicating the first UE to switch from a direct path to a relay path.

At S404, the first UE may perform an RLC operation and/or a PDCP operation. The first UE may perform the RLC operation and/or the PDCP operation in response to being triggered by the switching command. The RLC operation here may be an RLC operation of the source path. In this step, the first UE may perform only the RLC operation of the source path, or may perform both the RLC operation of the source path and PDCP operation. In this step, whether to perform the PDCP operation may be determined according to a trigger condition for performing the PDCP operation. For example, if the first UE starts performing the PDCP operation in response to being triggered by the switching command, the first UE may perform both the RLC operation of the source path and the PDCP operation at this step. For another example, if the first UE starts performing the PDCP operation in response to being triggered by the first message as described above, the first UE may perform only the RLC operation at this step.

For the RLC operation of the source path, the first UE may reserve an RLC entity (corresponding to the source path) in the first UE, or the first UE may release or reconstruct the RLC entity (corresponding to the source path) in the first UE. For the PDCP operation, a PDCP entity of the first UE may perform at least one of following: PDCP reconstruction, PDCP data restoration, PDCP reconfiguration, or switching a transmission path of PDCP data from a source path to a target path.

At S406, the first UE may establish a connection with a target network device. The connection between the first UE and the target network device may include a connection between the first UE and relay UE, and/or a connection between the relay UE and the target network device. The connection between the first UE and the relay UE may refer to a PC5 connection, and the connection between the relay UE and the target network device may refer to a Uu connection.

In the embodiments of the disclosure, the way in which the first UE establishes the connection with the target network device is not specifically limited. For example, the first UE may firstly establish a connection with the relay UE, and sends information to the relay UE. The information may be used for indicating that the first UE needs to establish a connection with the target network device. When receiving this information, the relay UE may establish a connection with the target network device and send the information to the target network device. After receiving this information, the target network device may reply a confirmation message to the first UE through the relay UE. Through the above steps, connection establishment between the first UE and the target network device is completed.

In addition, the first UE may also perform an RLC operation and/or a PDCP operation. For the PDCP operation, if the PDCP operation is to be executed in response to being triggered by the switching command, the first UE may perform the PDCP operation at S404. If the PDCP operation is to be executed in response to being triggered by the first message from the relay UE, the first UE may perform the PDCP operation at S406. That is to say, the specific step at which the PDCP operation is performed can be determined according to actual situations.

The first message may indicate at least one of following: connection establishment between the relay UE and the target network device is completed; connection configuration between the relay UE and the target network device is completed; connection establishment between the relay UE and the first UE is completed; and connection configuration between the relay UE and the first UE is completed.

The RLC operation at S406 may be an RLC operation of the target path. The event that the first UE performs the RLC operation of the target path may refer to that the first UE establishes an RLC entity corresponding to the target path, for example a PC5 RLC entity.

At S408, the target network device may also send indication information to the first UE. The indication information is used for indicating the first UE to release or reconstruct an RLC entity (corresponding to the source path) in the first UE.

If the first UE reserves the RLC entity (corresponding to the source path) in the first UE at S404, the target network device may send the indication information to the first UE to indicate the first UE to release or reconstruct the RLC entity (corresponding to the source path) in the first UE. If the first UE releases or reconstructs the RLC entity (which corresponds to the source path) in the first UE at S404, the target network device may not send the indication information to the first UE.

At S410, after receiving the indication information, the first UE may release or reconstruct the RLC entity (corresponding to the source path) in the first UE.

It may be understood that the target network device and the source network device in FIG. 4 may be the same network device, or may be different network devices.

Figure 5:
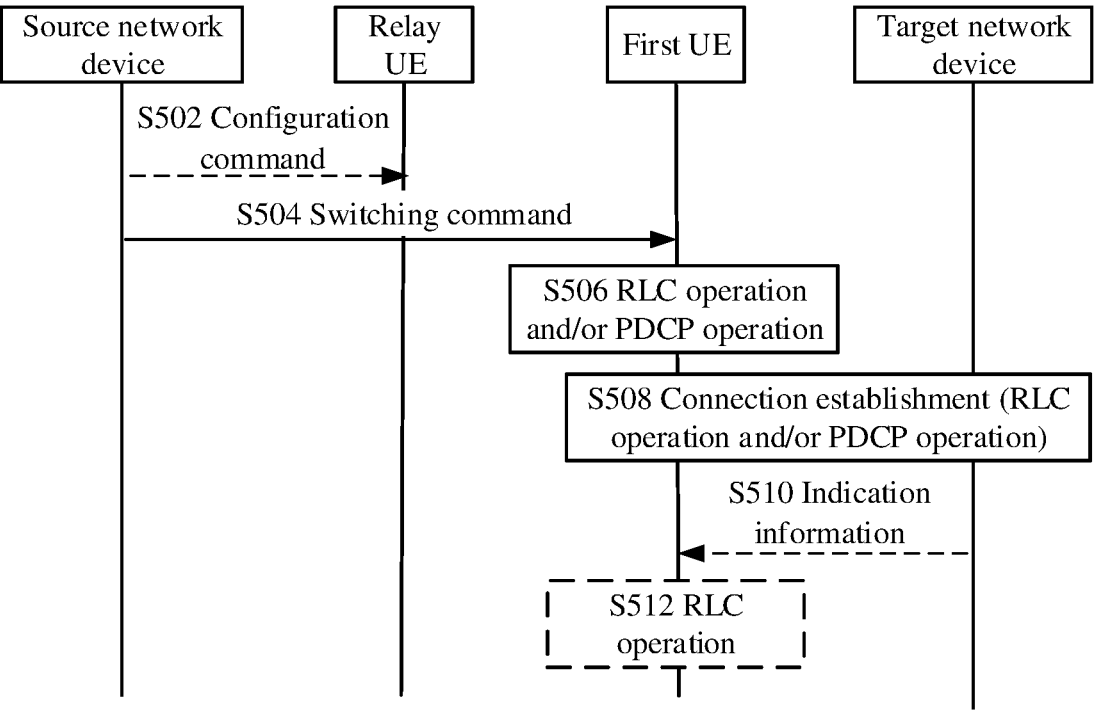
FIG. 5 illustrates a schematic flowchart of a path switching method according to another embodiment of the disclosure.

FIG. 5 illustrates a process that first UE switches from a relay path to a direct path. That is to say, in the method illustrated in FIG. 5, a source path is a relay path, and a target path is a direct path. Referring to FIG. 5, at S502, a source network device sends a configuration command to relay UE.

The configuration command may be used for indicating the relay UE to release a connection with the first UE. For example, the configuration command may be used for indicating the relay UE to release or reconstruct a PC5 RLC entity (corresponding to the source path) in the relay UE.

At S504, the source network device sends a switching command to first UE. The switching command may be used for indicating the first UE to switch from a relay path to a direct path.

Optionally, the source network device may also send no configuration command to the relay UE. In such a situation, the relay UE may keep a connection with the first UE. In a situation where the first UE does not switch to the target path successfully, the first UE may still communicate with the source network device through the relay UE.

At S506, the first UE may perform an RLC operation and/or a PDCP operation. The first UE may perform the RLC operation and/or the PDCP operation in response to being triggered by the switching command. The RLC operation here may be an RLC operation of the source path. In this step, the first UE may perform only the RLC operation of the source path, or may perform only the PDCP operation, or may perform both the RLC operation of the source path and PDCP operation. For the RLC operation of the source path, the first UE may reserve an RLC entity (corresponding to the source path) in the first UE, or the first UE may release or reconstruct the RLC entity (corresponding to the source path) in the first UE. For the PDCP operation, a PDCP entity of the first UE may perform at least one of following: PDCP reconstruction, PDCP data restoration, PDCP reconfiguration, or switching a transmission path of PDCP data from a source path to a target path.

At S508, the first UE establishes a connection with a target network device. The connection between the first UE and the target network device is a direct connection between the first UE and the target network device.

In addition, the first UE may also perform an RLC operation and/or a PDCP operation. For the PDCP operation, if the PDCP operation is to be executed in response to being triggered by the switching command, the first UE may perform the PDCP operation at S506. If the PDCP operation is to be executed in response to being triggered by the first message from the relay UE, the first UE may perform the PDCP operation at S508. That is to say, the specific step at which the PDCP operation is performed can be determined according to actual situations.

The first message may indicate at least one of following: connection configuration between the relay UE and the first UE is completed; connection release between the relay UE and the first UE is completed; the relay UE has sent to the source network device the uplink data which was sent from the first UE to the source network device; or the relay UE has sent to the first UE the downlink data which was sent from the source network device to the first UE.

The RLC operation at S508 may be an RLC operation of the target path. The event that the first UE performs the RLC operation of the target path may refer to that the first UE establishes an RLC entity corresponding to the target path, for example a Uu RLC entity.

At S510, the target network device may also send indication information to the first UE. The indication information is used for indicating the first UE to release or reconstruct an RLC entity (corresponding to the source path) in the first UE.

If the first UE reserves the RLC entity (corresponding to the source path) in the first UE at S506, the target network device may send the indication information to the first UE.

If the first UE releases or reconstructs the RLC entity (corresponding to the source path) in the first UE at S506, the target network device may not send the indication information to the first UE.

At S512, after receiving the indication information, the first UE may release or reconstruct the RLC entity (corresponding to the source path) in the first UE.

It may be understood that the target network device and the source network device in FIG. 5 may be the same network device, or may be different network devices.

Figure 6:
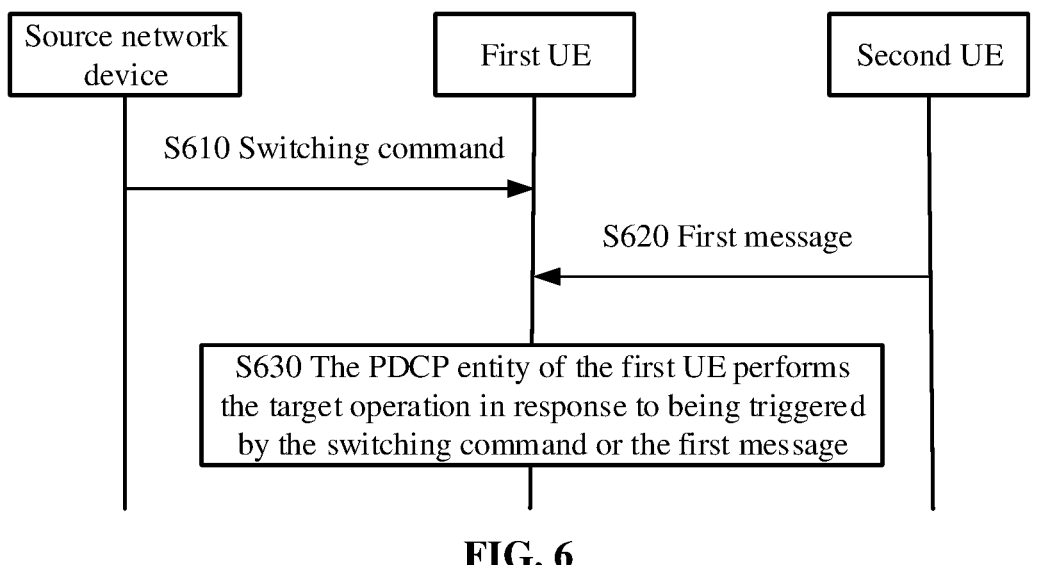
FIG. 6 illustrates a schematic flowchart of a wireless communication method according to another embodiment of the disclosure.

FIG. 6 illustrates a wireless communication method according to another embodiment of the disclosure. The method of FIG. 6 may be performed by first UE, second UE and a source network device. The first UE may be the first UE in FIG. 3, FIG. 4 or FIG. 5. Content that is not briefly described for FIG. 6 may refer to the description above. The first UE is UE switching from a source path to a target path. The source path is a path between the first UE and the source network device, and the target path is a path between the first UE and a target network device. The target network device and the source network device may be the same network device, or may be different network devices. At least one of the source path and the target path is a relay path. For example, the source path is a relay path, and the target path is a direct path. For another example, the source path is a direct path, and the target path is a relay path. For yet another example, both the source path and the target path are relay paths.

At S610, a source network device sends a switching command to first UE. The switching command may be used for indicating the first UE to switch from a source path to a target path. Optionally, the switching command is also used for triggering a PDCP entity of the first UE to perform a target operation.

At S620, second UE sends a first message to the first UE. The second UE is relay UE on a relay path. In other words, the first message may be a message from relay UE. If the source path is a relay path, the second UE is relay UE on the source path. If the target path is a relay path, the second UE may be relay UE on the target path.

At S630, the PDCP entity of the first UE performs the target operation in response to being triggered by the switching command or the first message. The target operation may include at least one of following: PDCP reconstruction, PDCP data restoration, PDCP reconfiguration, or switching a transmission path of PDCP data from a source path to a target path. The PDCP reconfiguration is used for enabling the PDCP entity to support simultaneous performing data transmission on the source path and the target path.

The first message may be a message sent by the second UE as a relay node on the relay path. If the target path is a relay path, the first message may be a message sent by relay UE on the target path. If the source path is a relay path, the first message may be a message sent by relay UE on the source path. If both the source path and the target path are relay paths, the first message may be a message sent by relay UE on the source path, or may be a message sent by relay UE on the target path.

In the embodiments of the disclosure, the switching command or the first message is used as a trigger condition for the PDCP entity of the first UE to perform the PDCP operation, so that the PDCP entity of the first UE makes clear the time for performing the PDCP operation, thereby facilitating the first UE to perform path switching.

If the second UE is relay UE on the target path, the first message may indicate at least one of following: connection establishment between the second UE and the target network device is completed; connection configuration between the second UE and the target network device is completed; connection establishment between the second UE and the first UE is completed; and connection configuration between the second UE and the first UE is completed. If the second UE is a relay UE on the source path, the first message may indicate at least one of following: connection configuration between the second UE and the first UE is completed; connection release between the second UE and the first UE is completed; the second UE has sent to the source network device the uplink data which was sent from the first UE to the source network device; or the second UE has sent to the first UE the downlink data which was sent from the source network device to the first UE.

Figure 7:
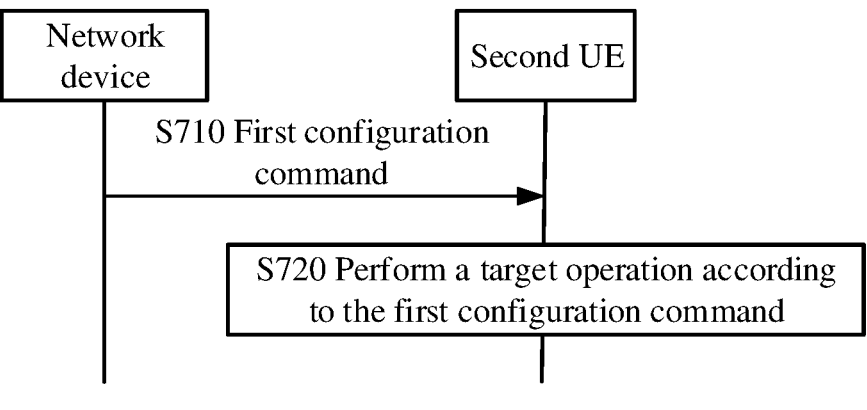
FIG. 7 illustrates a schematic flowchart of a wireless communication method according to another embodiment of the disclosure.

FIG. 7 illustrates a wireless communication method according to another embodiment of the disclosure. The method of FIG. 7 may be performed by second UE and a network device. The second UE may be relay UE on a relay path between first UE and the network device.

Referring to FIG. 7, at S710, the network device sends a first configuration command to second UE.

In an embodiment, the relay path may be a source path of the first UE before the first UE performs path switching, and the network device may be a network device on a source path. In other words, the first UE is UE switching from a source path to a target path, and the source path is a relay path. The second UE may be relay UE on any source path described above.

At S720, the second UE performs a target operation according to the first configuration command. The target operation includes at least one of following: stopping sending uplink data for the first UE and/or stopping receiving downlink data for the first UE; stopping sending and/or receiving sidelink data for the first UE; continuing sending uplink data for the first UE and/or continuing receiving downlink data for the first UE; or continuing sending and/or receiving sidelink data for the first UE.

The uplink data and downlink data may be data for the first UE transmitted between the second UE and the source network device. The uplink data may be data for the first UE sent from the second UE to the source network device. The downlink data may be data for the first UE sent from the source network device to the second UE. The sidelink data refers to data transmitted between the second UE and the first UE. The sidelink data may be data for the first UE sent from the first UE to the second UE, or may be data for the first UE sent from the second UE to the first UE.

For convenience of description, the data sending and/or receiving above may be referred to as data transmission on the source path for short hereinafter.

The second UE stopping or continuing data transmission on the source path can be realized by the first configuration command indicating the second UE to configure an RLC entity in the second UE.

For example, the first configuration command may be used for indicating the second UE to release or reconstruct the RLC entity (corresponding to the source path) in the second UE. Further, the second UE may release or reconstruct the RLC entity (corresponding to the source path) in the second UE according to the first configuration command, so as to realize stopping data transmission on the source path. For another example, the first configuration command may be used for indicating the second UE to reserve the RLC entity (corresponding to the source path) in the second UE. Further, the second UE may reserve the RLC entity (corresponding to the source path) in the second UE according to the first configuration command, so as to realize continuing data transmission on the source path.

During the first UE performing path switching, the second UE continuing the data transmission on the source path can ensure the reliability of data transmission on the source path, avoiding data packet loss on the source path.

The first configuration command may be the same as or different from the switching command described above. For example, the first configuration command is the same as the switching command. The network device (e.g., a source network device) may send a same command to the first UE and the second UE, and this command may be used for indicating the first UE to perform path switching or indicating the second UE to perform a target operation. For another example, the first configuration command is different from the switching command. The network device (for example a source network device) may send different commands to the first UE and the second UE respectively. The network device sends a switching command to the first UE to indicate the first UE to perform path switching. The network device sends a first configuration command to the second UE to indicate the second UE to perform a target operation.

Optionally, the network device may also send a second configuration command to the second UE. The second configuration command is used for indicating the second UE to release a connection with the first UE. For example, the second configuration command may be used for indicating the second UE to release or reconstruct a PC5 RLC entity (corresponding to the source path) in the second UE. Further, the second UE may release a connection with the first UE according to the second configuration command.

Similar to the first configuration command, the second configuration command may be the same as or different from the switching command, which is not specifically limited in the embodiments of the disclosure.

It may be understood that the first configuration command may be the same as or different from the second configuration command. For example, the source network device may send a configuration command to the second UE. The configuration command is used for indicating the second UE to perform a target operation and to release a connection with the first UE.

Figure 8:
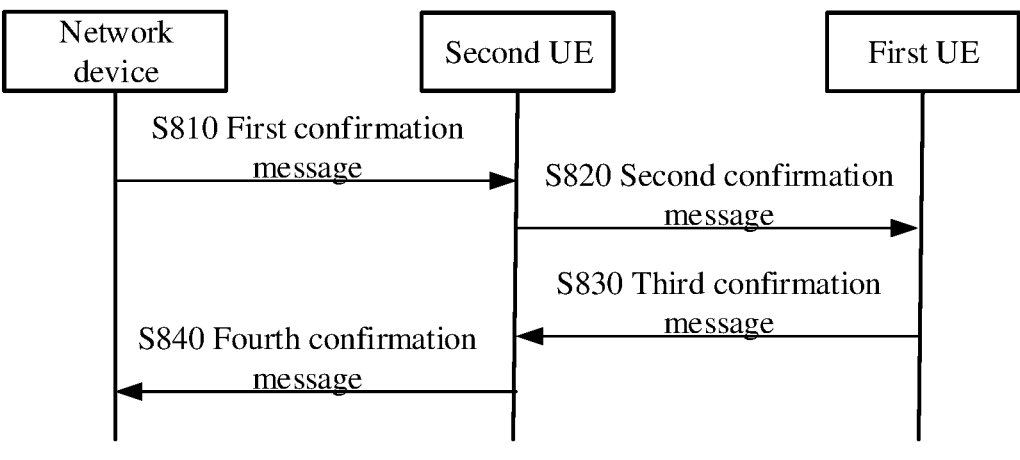
FIG. 8 illustrates a schematic flowchart of a wireless communication method according to another embodiment of the disclosure.

FIG. 8 illustrates a wireless communication method according to another embodiment of the disclosure. The method of FIG. 8 may be performed by first UE, second UE and a network device. The second UE is relay UE. The method of FIG. 8 may be applied to a scenario where the first UE communicates with the network device through the second UE. A path between the first UE and the network device is a relay path, and the second UE is relay UE on the relay path.

As illustrated in FIG. 8, at S810, the network device sends a first confirmation message to the second UE. The first confirmation message may be used for indicating that the network device has correctly received uplink data that is sent by the second UE for first UE.

Optionally, before S810, the method may further include that the first UE sends the uplink data to the second UE. Further, the second UE may send this uplink data to the network device. If the network device correctly receives the uplink data, the network device may send a first confirmation message for the uplink data to the second UE.

At S820, the second UE feeds back a second confirmation message for the uplink data to the first UE according to the first confirmation message.

If the second UE does not receive the uplink data correctly and/or the network device does not receive the uplink data correctly, the second UE will feed back no second confirmation message for the uplink data to the first UE.

The method illustrated in FIG. 8 may further include S830 and S840. It may be understood that the method illustrated in FIG. 8 may merely include S810 and S820, or may merely include S830 and S840, or may include S810 to S840.

At S830, the first UE sends a third confirmation message to the second UE. The third confirmation message may be used for indicating that the first UE has correctly received downlink data that is sent by the second UE for first UE.

Optionally, before S830, the method may further include that: the network device sends the downlink data to the second UE. Further, the second UE may send the downlink data to the first UE. If the first UE correctly receives the downlink data, the first UE may send a third confirmation message for the downlink data to the second UE.

At S840, the second UE feeds back a fourth confirmation message for the downlink data to the network device according to the third confirmation message.

If the second UE does not receive the downlink data correctly and/or the first UE does not receive the downlink data correctly, the second UE will feed back no fourth confirmation message for the downlink data to the network device.

The confirmation messages described above may be borne in a status protocol data unit (status PDU), or borne in a receipt. For example, the status PDU may include acknowledgement (ACK) information and/or negative acknowledgement (NACK) information. ACK indicates correct receiving, and NACK indicates incorrect receiving.

In related art, the second UE feeds back a confirmation message to the first UE after correctly receiving the uplink data from the first UE. If the second UE does not transmit the uplink data to the network device successfully after replying a confirmation message to the first UE, misjudgment of the first UE will be caused. That is, the first UE will erroneously consider that the uplink data has been transmitted successfully and will not perform data retransmission. In this way, the transmission conditions of the uplink data cannot be fed back correctly, leading to data packet loss. However, the scheme of the embodiments of the disclosure is that the second UE feeds back a confirmation message to the first UE after the network device has correctly received the uplink data from the first UE, thus data packet loss can be avoided.

Similarly, for the data sent by the network device, the second UE feeds back a confirmation message to the network device after the first UE correctly receives the downlink data sent from the network device, rather than that the second UE feeds back a confirmation message to the network device after the second UE correctly receives the downlink data sent from the network device. Thus, the transmission conditions of the downlink data can be fed back to the network device correctly, avoiding data packet loss.

The above method may be applied to a path switching scenario involving a relay path, such as the scenarios illustrated in FIG. 3 to FIG. 7. For example, in a path switching scenario involving a relay path, if the target path is a relay path, the second UE illustrated in FIG. 8 may be relay UE on the target path, and the network device may be a target network device on the target path. The second UE may feed back a confirmation message to the first UE after the target network device correctly receives the uplink data sent from the first UE. Alternatively, the second UE may feed back a confirmation message to the target network device after the first UE correctly receives the downlink data sent from the target network device.

For another example, in a path switching scenario involving a relay path, if the source path is a relay path, the second UE may be relay UE on the source path, and the network device may be a source network device on the source path. The second UE may feed back a confirmation message to the source network device after the first UE correctly receives the downlink data sent from the source network device. Alternatively, the second UE may feed back a confirmation message to the first UE after the source network device correctly receives the uplink data sent from the first UE.

The method illustrated in FIG. 8 is especially applicable for a path switching scenario involving a relay path. That is because the scenario involves releasing a source path and establishing a target path, during which processes packet loss may easily occur. By adopting the embodiments of the disclosure, the second UE serving as relay UE makes a feedback to a data sender only after the second UE receives a confirmation that a data receiver has correctly received data. In this way, the problem of packet loss during path switching can be effectively alleviated.

Figure 9:
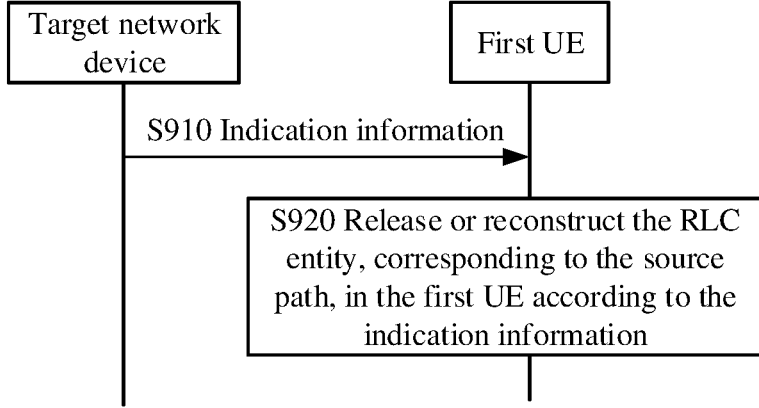
FIG. 9 illustrates a schematic flowchart of a wireless communication method according to another embodiment of the disclosure.

FIG. 9 illustrates a wireless communication method according to another embodiment of the disclosure. The method of FIG. 9 may be performed by a target network device and first UE. The first UE is UE switching from a source path to a target path. The first UE may be any first UE described above. The source path is a path between the first UE and the source network device, and the target path is a path between the first UE and a target network device. The target network device is a network device on the target path. For example, the target network device may be any target network device described above. Content that is not briefly described for FIG. 9 may refer to the description above.

At S910, the target network device may send indication information to the first UE. The indication information may be used for indicating the first UE to release or reconstruct an RLC entity (corresponding to the source path) in the first UE.

At S920, the first UE may release or reconstruct the RLC entity (corresponding to the source path) in the first UE according to the indication information.

The target network device may send the indication information to the first UE after the first UE completes path switching.

It can be seen from the above description that the switching command may be used for indicating the first UE to reserve the RLC entity (corresponding to the source path) in the first UE, or the switching command may be used for indicating the first UE to release or reconstruct the RLC entity (corresponding to the source path) in the first UE. If the switching command is used for indicating the first UE to reserve the RLC entity (corresponding to the source path) in the first UE, the target network device may indicate, by the indication information, the first UE to release or reconstruct the RLC entity (corresponding to the source path) in the first UE.

The description above is made with the first UE being remote UE and the second UE being relay UE as an example. However, this is merely an example, and the method described above is also applicable to a scenario of communication between relay UEs. Namely, both the first UE and the second UE in the embodiments of the disclosure may be relay UE.

The methods of embodiments illustrated in FIG. 3 to FIG. 9 may be implemented alone or combined with one another, which is not specifically limited in the embodiments of the disclosure.

The method embodiments of the disclosure are detailed above in conjunction with FIG. 1 to FIG. 9. The apparatus embodiments of the disclosure will be detailed hereinafter in conjunction with FIG. 10 to FIG. 18. It should be understood that the description about the method embodiments corresponds to the description of the apparatus embodiments; therefore, parts that are not described in detail can refer to the foregoing method embodiment.

Figure 10:
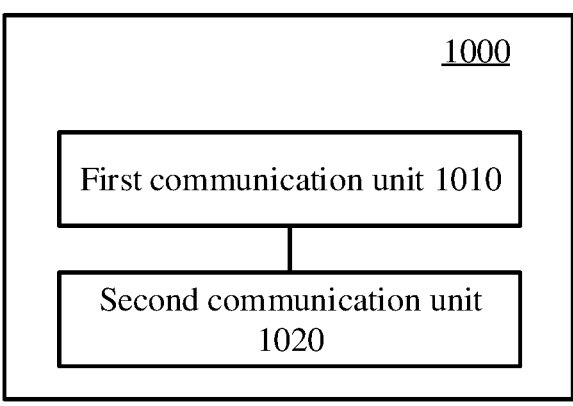
FIG. 10 illustrates a schematic structural diagram of a device for wireless communication according to an embodiment of the disclosure.

FIG. 10 illustrates a schematic structural diagram of a device for wireless communication according to an embodiment of the disclosure. The wireless communication device 10000 of FIG. 10 may correspond to the first UE of FIG. 3. The wireless communication device 1000 includes a first communication unit 1010 and a second communication unit 1020. The first communication unit 1010 may be configured to receive a switching command from a source network device. The switching command is used for indicating the first UE to switch from a source path to a target path. The source path is a path between the first UE and the source network device. The target path is a path between the first UE and a target network device. At least one of the source path or the target path is a relay path.

The second communication unit 1020 is configured to: start performing sending uplink data and/or performing receiving downlink data on the target path in response to being triggered by the switching command or a first message. The first message is sent by second UE to the first UE, and the second UE is relay UE on the relay path.

Optionally, the second UE is relay UE on the target path. The first message indicates at least one event of following: connection establishment between the second UE and the target network device is completed; connection configuration between the second UE and the target network device is completed; connection establishment between the second UE and the first UE is completed; and connection configuration between the second UE and the first UE is completed.

Optionally, the second UE is relay UE on the source path. The first message indicates at least one event of following: connection configuration between the second UE and the first UE is completed; connection release between the second UE and the first UE is completed; the second UE has sent to the source network device uplink data which was sent from the first UE to the source network device; and the second UE has sent to the first UE downlink data which was sent from the source network device to the first UE.

Optionally, the device 1000 further includes a connection establishment unit. The connection establishment unit is configured to establish a connection with a target device on the target path. The target path is a relay path and the target device is relay UE on the target path; or the target path is a direct path between the first UE and the target network device and the target device is the target network device.

Optionally, the connection establishment unit is configured to establish an RLC entity corresponding to the target path.

Optionally, the device 1000 further includes an execution unit. The execution unit is configured to: in response to being triggered by the switching command or the first message, perform a target operation by using a PDCP entity. The target operation includes at least one of following: PDCP reconstruction, PDCP data restoration, PDCP reconfiguration, or switching a transmission path of PDCP data from a source path to a target path.

Optionally, the PDCP reconfiguration is used for enabling the PDCP entity to support simultaneous performing data transmission on the source path and the target path.

Optionally, the wireless communication device further includes a third communication unit. The third communication device is configured to: according to the switching command, stop or continue sending uplink data and/or receiving downlink data on the source path.

Optionally, the third communication device is configured to release or reconstruct an RLC entity (corresponding to the source path) in the first UE according to the switching command.

Optionally, the wireless communication device further includes a fourth communication unit. The fourth communication unit is configured to receive indication information from the target network device. The indication information is used for indicating the first UE to release or reconstruct an RLC entity (corresponding to the source path) in the first UE.

Optionally, the source network device and the target network device are a same network device.

Figure 11:
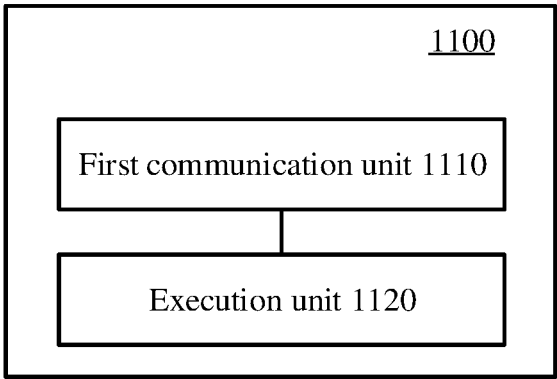
FIG. 11 illustrates a schematic structural diagram of a device for wireless communication according to another embodiment of the disclosure.

FIG. 11 illustrates a schematic structural diagram of a device for wireless communication according to another embodiment of the disclosure. The device 1100 of FIG. 11 may correspond to the first UE of FIG. 6. The wireless communication device 1100 includes a first communication unit 1110 and an execution unit 1120.

The first communication unit 1110 is configured to: receive, from a source network device, a switching command for indicating the first UE to switch from a source path to a target path. The source path is a path between the first UE and the source network device. The target path is a path between the first UE and a target network device. At least one of the source path or the target path is a relay path.

The execution unit 1120 is configured to: in response to being triggered by the switching command or a first message, perform a target operation by using a PDCP entity. The first message is sent by second UE to the first UE, and the second UE is relay UE on the relay path. The target operation includes at least one of following: PDCP reconstruction, PDCP data restoration, PDCP reconfiguration, or switching a transmission path of PDCP data from a source path to a target path.

Optionally, the second UE is relay UE on the target path. The first message indicates at least one event of following: connection establishment between the second UE and the target network device is completed; connection configuration between the second UE and the target network device is completed; connection establishment between the second UE and the first UE is completed; or connection configuration between the second UE and the first UE is completed.

Optionally, the second UE is relay UE on the source path. The first message indicates at least one event of following: connection configuration between the second UE and first UE is completed; connection release between the second UE and the first UE is completed; the second UE has sent to the source network device uplink data which was sent from the first UE to the source network device; or the second UE has sent to the first UE downlink data which was sent from the source network device to the first UE.

Optionally, the PDCP reconfiguration is used for enabling the PDCP entity to support simultaneous performing data transmission on the source path and the target path.

Optionally, the source network device and the target network device are a same network device.

Figure 12:
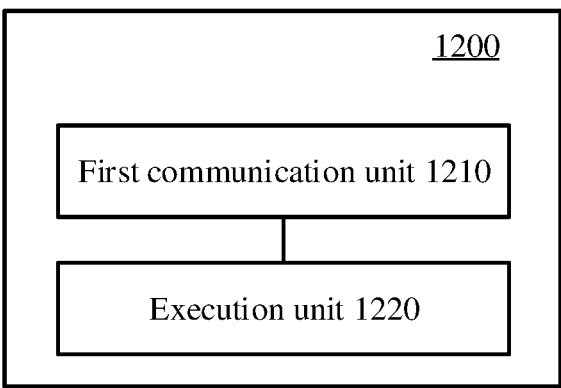
FIG. 12 illustrates a schematic structural diagram of a device for wireless communication according to yet another embodiment of the disclosure.

FIG. 12 illustrates a schematic structural diagram of a device for wireless communication according to another embodiment of the disclosure. The device 1200 of FIG. 12 may correspond to the second UE of FIG. 7. The device 1200 includes a first communication unit 1210 and an execution unit 1220.

The first communication unit 1210 is configured receive a first configuration command from a network device.

The execution unit 1220 is configured to perform a target operation according to the first configuration command. The target operation includes at least one of following: stopping sending uplink data for the first UE and/or stopping receiving downlink data for the first UE; stopping sending and/or receiving sidelink data for the first UE; continuing sending uplink data for the first UE and/or continuing receiving downlink data for the first UE; or continuing sending and/or receiving sidelink data for the first UE.

Optionally, the target operation is at least one of: stopping sending uplink data for the first UE and/or stopping receiving downlink data for the first UE; or stopping sending and/or receiving sidelink data for the first UE. The execution unit 1220 is configured to: release or reconstruct an RLC entity (corresponding to the relay path) in the second UE according to the first configuration command.

Optionally, the target operation is at least one of: continuing sending uplink data for the first UE and/or continuing receiving downlink data for the first UE; or continuing sending and/or receiving sidelink data for the first UE. The execution unit 1220 is configured to reserve an RLC entity (corresponding to the relay path) in the second UE according to the first configuration command.

Optionally, the device 1200 further includes a second communication unit. The second communication unit is configured to receive a second configuration command from the network device. The second configuration command is used for indicating the second UE to release a connection with the first UE.

Optionally, the device 1200 further includes a third communication unit and/or a fourth communication unit. The third communication unit is configured to receive a first confirmation message from the network device. The first confirmation message indicates that the network device has correctly received uplink data that is sent by the second UE for the first UE. The third communication unit is further configured to feed back a second confirmation message for the uplink data to the first UE according to the first confirmation message. The fourth communication unit is configured to receive a third confirmation message from the first UE. The third confirmation message indicates that the first UE has correctly received downlink data that is sent by the second UE for the first UE. The fourth communication unit is further configured to feed back a fourth confirmation message for the downlink data to the network device according to the third confirmation message.

Optionally, the relay path is a source path of the first UE before the first UE performs path switching, and the network device is a network device on the source path.

Optionally, the device 1200 further includes a fifth communication unit. The fifth communication unit is configured to send a first message to first UE. The first message is used for triggering the first UE to start sending uplink data and/or receiving downlink data on a target path. The target path is a path of the first UE after the first UE performs path switching.

Optionally, the first message indicates at least one of following: connection configuration between the second UE and the first UE is completed; connection release between the second UE and the first UE is completed; the second UE has sent to the source network device the uplink data which was sent from the first UE to the source network device; or the second UE has sent to the first UE downlink data which was sent from the source network device to the first UE.

Figure 13:
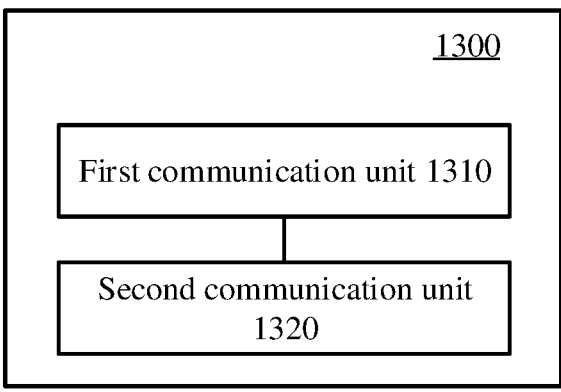
FIG. 13 illustrates a schematic structural diagram of a device for wireless communication according to yet another embodiment of the disclosure.

FIG. 13 illustrates a schematic structural diagram of a device for wireless communication according to another embodiment of the disclosure. The device 1300 of FIG. 13 may correspond to the second UE of FIG. 8. The device 1300 includes a first communication unit 1310 and a second communication unit 1320.

The first communication unit 1310 is configured to receive a first confirmation message from a network device. The first confirmation message indicates that the network device has correctly received uplink data that is sent by the second UE for first UE. The first communication unit is further configured to feed back a second confirmation message for the uplink data to first UE according to the first confirmation message.

The second communication unit 1320 is configured to receive a third confirmation message from the first UE. The third confirmation message indicates that the first UE has correctly received downlink data that is sent by the second UE for the first UE. The second communication unit is further configured to feed back a fourth confirmation message for the downlink data to the network device according to the third confirmation message.

A path between the first UE and the network device is a relay path, and the second UE is relay UE on the relay path.

Optionally, the relay path is a source path of the first UE before the first UE performs path switching, and the network device is a network device on the source path; or the relay path is a target path of the first UE after the first UE performs path switching, and the network device is a network device on the target path.

Figure 14:
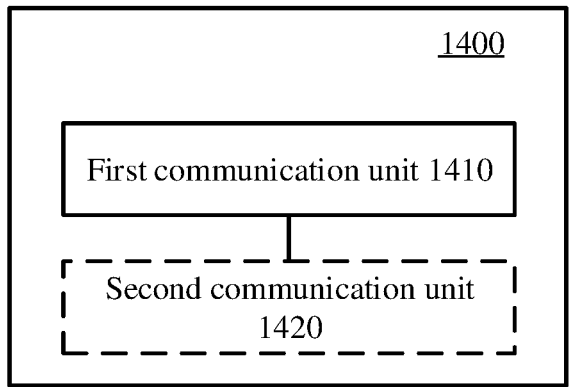
FIG. 14 illustrates a schematic structural diagram of a device for wireless communication according to yet another embodiment of the disclosure.

FIG. 14 illustrates a schematic structural diagram of a device for wireless communication according to another embodiment of the disclosure. The device 1400 of FIG. 14 may correspond to the second UE of FIG. 3. The device 1400 includes a communication unit 1410.

The first communication unit 1410 is configured to send a first message to first UE. The first message is used for triggering the first UE to start sending uplink data and/or receiving downlink data on a target path. The target path is a path of the first UE after the first UE performs path switching from a source path. At least one of the source path or the target path is a relay path, and the second UE is relay UE on the relay path.

Optionally, the second UE is relay UE on the target path, a network device on the target path is a target network device. The first message indicates at least one event of following: connection establishment between the second UE and the target network device is completed; connection configuration between the second UE and the target network device is completed; connection establishment between the second UE and the first UE is completed; or connection configuration between the second UE and the first UE is completed.

Optionally, the second UE is relay UE on the source path. A network device on the source path is a source network device. The first message indicates at least one event of following: connection configuration between the second UE and the first UE is completed; connection release between the second UE and the first UE is completed; the second UE has sent to the source network device uplink data which was sent from the first UE to the source network device; or the second UE has sent to the first UE downlink data which was sent from the source network device to the first UE.

Optionally, the first message is used for triggering a PDCP entity of the first UE to perform a first target operation. The first target operation includes at least one of following: PDCP reconstruction, PDCP data restoration, PDCP reconfiguration, or switching a transmission path of PDCP data from a source path to a target path.

Optionally, the PDCP reconfiguration is used for enabling the PDCP entity to support simultaneous performing data transmission on the source path and the target path.

Optionally, the second UE is relay UE on the source path. A network device on the source path is a source network device. The device 1400 further includes a second communication unit 1420 and an execution unit. The second communication unit 1420 is configured receive a first configuration command from the source network device. The execution unit is configured to perform a second target operation according to the first configuration command. The second target operation includes at least one of following: stopping at least one of sending uplink data or receiving downlink data for the first UE; stopping sending and/or receiving sidelink data for the first UE; continuing at least one of sending uplink data or receiving downlink data for the first UE; or continuing sending and/or receiving sidelink data for the first UE.

Optionally, the second UE is relay UE on the source path. A network device on the source path is a source network device. The device 1400 further includes a third communication unit. The third communication unit is configured to receive a second configuration command from the source network device. The second configuration command is used for indicating the second UE to release a connection with the first UE.

Figure 15:
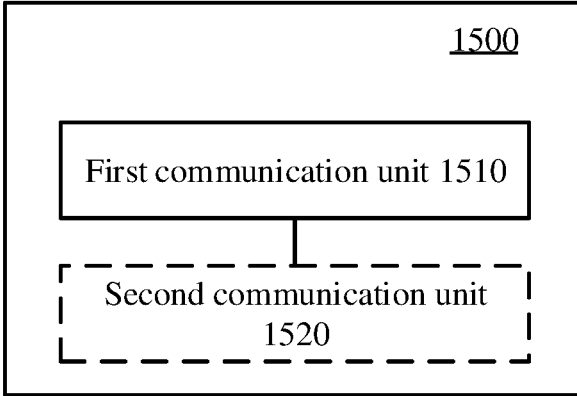
FIG. 15 illustrates a schematic structural diagram of a device for wireless communication according to yet another embodiment of the disclosure.

FIG. 15 illustrates a schematic structural diagram of a device for wireless communication according to another embodiment of the disclosure. The device 1500 of FIG. 15 may correspond to the source network device of FIG. 3. The device 1500 includes a first communication unit 1510.

The first communication unit 1510 is configured to send a switching command to first UE. The switching command is used for indicating the first UE to switch from a source path to a target path. The source path is a path between the first UE and the source network device. The target path is a path between the first UE and a target network device. At least one of the source path or the target path is a relay path. The switching command is used for triggering the first UE to start sending uplink data and/or receiving downlink data on the target path.

Optionally, the switching command is used for triggering a PDCP entity of the first UE to perform a first target operation. The first target operation includes at least one of following: PDCP reconstruction, PDCP data restoration, PDCP reconfiguration, or switching a transmission path of PDCP data from a source path to a target path.

Optionally, the PDCP reconfiguration is used for enabling the PDCP entity to support simultaneous performing data transmission on the source path and the target path.

Optionally, the switching command is used for indicating the first UE to stop or continue sending uplink data and/or receiving downlink data on the source path.

Optionally, the switching command is used for indicating the first UE to release or reconstruct an RLC entity (corresponding to the source path) in the first UE.

Optionally, the second UE is relay UE on the source path, and the device 1500 further includes a second communication unit 1520. The second communication unit 1520 is configured to send a first configuration command to the second UE. The first configuration command is used for indicating the first UE to perform a second target operation. The second target operation includes at least one of following: stopping at least one of sending uplink data or receiving downlink data for the first UE; stopping at least one of sending sidelink data or receiving sidelink data for the first UE; continuing at least one of sending uplink data or receiving downlink data for the first UE; or continuing at least one of sending sidelink data or receiving sidelink data for the first UE.

Optionally, the second target operation is at least one of: stopping at least one of sending uplink data or receiving downlink data for the first UE; or stopping at least one of sending sidelink data or receiving sidelink data for the first UE. The first configuration command is further used for indicating the second UE to release or reconstruct an RLC entity (corresponding to the relay path) in the second UE.

Optionally, the second target operation is at least one of: continuing at least one of sending uplink data or receiving downlink data for the first UE; or continuing at least one of sending sidelink data or receiving sidelink data for the first UE. The first configuration command is further used for indicating the second UE to reserve an RLC entity (corresponding to the relay path) in the second UE.

Optionally, the second UE is relay UE on the source path, and the device 1500 further includes a third communication unit. The third communication unit is configured to send a second configuration command to the second UE. The second configuration command is used for indicating the second UE to release a connection with the first UE.

Figure 16:
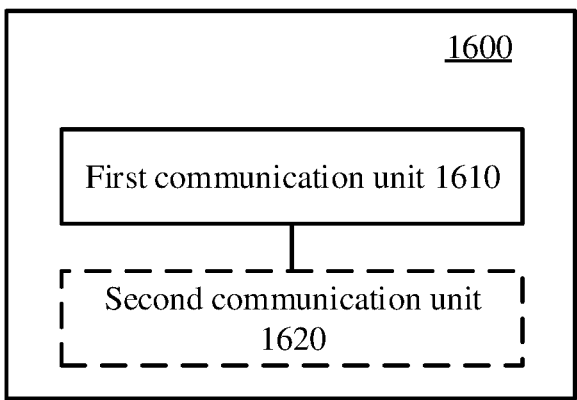
FIG. 16 illustrates a schematic structural diagram of a device for wireless communication according to yet another embodiment of the disclosure.

FIG. 16 illustrates a schematic structural diagram of a device for wireless communication according to another embodiment of the disclosure. The device 1600 of FIG. 16 may correspond to the network device of FIG. 7. The device 1600 includes a first communication unit 1610.

The first communication unit 1610 is configured to send a first configuration command to second UE. A path between the network device and first UE is a relay path. The second UE is relay UE on the relay path. The first configuration command is used for indicating the second UE to perform a target operation. The target operation includes at least one of following: stopping at least one of sending uplink data or receiving downlink data for the first UE; stopping at least one of sending sidelink data or receiving sidelink data for the first UE; continuing at least one of sending uplink data or receiving downlink data for the first UE; or continuing at least one of sending sidelink data or receiving sidelink data for the first UE.

Optionally, the target operation is at least one of: stopping at least one of sending uplink data or receiving downlink data for the first UE, or stopping at least one of sending sidelink data or receiving sidelink data for the first UE. The first configuration command is further used for indicating the second UE to release or reconstruct an RLC entity (corresponding to the relay path) in the second UE.

Optionally, the target operation is at least one of: continuing at least one of sending uplink data or receiving downlink data for the first UE, or continuing at least one of sending sidelink data or receiving sidelink data for the first UE. The first configuration command is further used for indicating the second UE to reserve an RLC entity (corresponding to the source path) in the second UE.

Optionally, the device 1600 further includes a second communication unit 1620. The second communication unit is configured to send a second configuration command to the second UE. The second configuration command is used for indicating the second UE to release a connection with the first UE.

Figure 17:
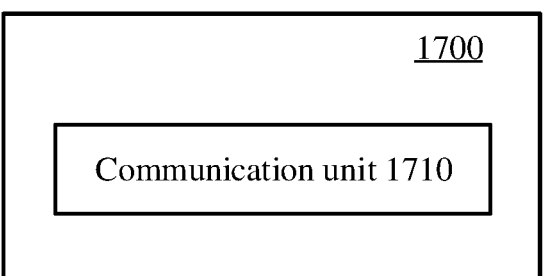
FIG. 17 illustrates a schematic structural diagram of a device for wireless communication according to yet another embodiment of the disclosure.

FIG. 17 illustrates a schematic structural diagram of a device for wireless communication according to another embodiment of the disclosure. The device 1700 of FIG. 17 may correspond to the target network device of FIG. 9. The device 1700 includes a communication unit 1710.

The communication unit 1710 is configured to send indication information to first UE. The indication information is used for indicating the first UE to release or reconstruct an RLC entity (corresponding to a source path) in the first UE. The source path is a path of the first UE before the first UE performs path switching. The target network device is a network device, on a target path, of the first UE after the first UE performs path switching. At least one of the source path or the target path is a relay path.

Figure 18:
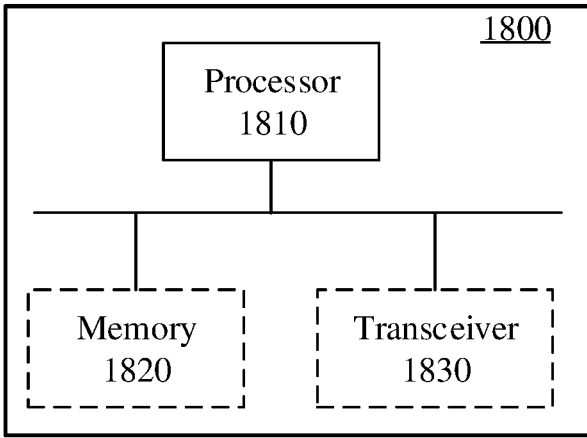
FIG. 18 illustrates a schematic structural diagram of a device for wireless communication according to yet another embodiment of the disclosure.

FIG. 18 illustrates a schematic structural diagram of a device for wireless communication according to an embodiment of the disclosure. The dashed lines in FIG. 18 indicate that the units or blocks are optional. The device 1800 may be used for implementing the method described in above method embodiments. The device 1800 may be a chip, UE or a network device.

The device 1800 may include one or more processors 1810. The processor 1810 may support the device 1800 to implement the method described in above method embodiments. The processor 1810 may be a universal processor or an application-specific processor. For example, the processor may be a central processing unit (CPU). Alternatively, the processor may also be a general-purpose processor, a digital signal processor (DSP), an application specific integrated circuit (ASIC), a field programmable gate array (FPGA), or another programmable logical device, a discrete gate or a transistor logical device, or a discrete hardware component. The universal processor may be a microprocessor or the processor may also be any conventional processor and the like.

The device 1800 may include one or more memories 1820. The memory 1820 is stored with a program that can be executed by the processor 1810 to enable the processor 1810 to perform the method as described in forgoing the method embodiments. The memory 1820 may be independent from or integrated in the processor 1810.

The device 1800 may further include a transceiver 1830. The processor 1810 may communicate with another device or chip through the transceiver 1830. For example, the processor 1810 may perform data transmitting and receiving with another device or chip through the transceiver 1830.

Embodiments of the disclosure further provide a computer-readable storage medium for storing a program. The computer-readable storage medium may be applied to UE (e.g., the first UE or the second UE above) or a network device (e.g., the source network device or the target network device above) provided in the embodiments of the disclosure, and the program enables a processor to implement the method performed by the UE or the network device in various embodiments of the disclosure.

Embodiments of the disclosure further provide a computer program product. The computer program product includes a program. The program product may be applied to UE (e.g., the first UE or the second UE above) or a network device (e.g., the source network device or the target network device above) provided in the embodiments of the disclosure, and the program enables a processor to implement the method performed by the UE or the network device in various embodiments of the disclosure.

Embodiments of the disclosure further provide a computer program. The computer program may be applied to UE (e.g., the first UE or the second UE above) or a network device (e.g., the source network device or the target network device above) provided in the embodiments of the disclosure, and the computer program enables a processor to implement the method performed by the UE or the network device in various embodiments of the disclosure.

It is to be understood that the term "and/or" herein merely describes a relation between associated objects, representing that three relations may exist. For example, A and/or B may represent following three cases: existence of A alone, existence of both A and B, and existence of B alone. The character "/" generally indicates that the contextual objects are in an "or" relationship.

It is to be understood that, in the embodiments of the disclosure, the sizes of the serial numbers of the above operations do not imply the sequential order in which the operations are performed, and shall not construe any limitation to the implementation of the embodiments of the disclosure. The order in which the operations are performed should be decided by their functions and internal logics.

In some embodiments provided in the disclosure, it is to be understood that the disclosed system, device and method may be implemented in other ways. For example, the device embodiment described above is only exemplary, and for example, division of the units is only division in logic functions, and division may be made in other ways during practical implementation. For example, multiple units or components may be combined or integrated into another system, or some features may be neglected or not executed. In addition, coupling or direct coupling or communication connection between various displayed or discussed components may be indirect coupling or communication connection, implemented through some interfaces, devices or units, and may be electrical and mechanical or in other forms.

The above embodiments may be implemented through software, hardware, firmware or a combination thereof as a whole or in part. When implemented by software, the embodiments may be realized in form of a computer program product as a whole or in part. The computer program product includes one or more computer instructions. The computer program instructions, when loaded into and executed by a computer, produce the flow or functions according to the embodiments of the disclosure as a whole or in part. The computer may be a general-purpose computer, a special-purpose computer, a computer network, or other programmable devices. The computer instructions may be stored in a computer-readable storage medium, or transmitted from one computer-readable storage medium to another computer-readable storage medium. For example, the computer instructions may be transmitted from a network station, a computer, a server or a data center to another network station, computer, server or data center in a wired (e.g., coaxial-cables, fiber, digital subscriber lines (DSLs)) or wireless (e.g., infrared, radio, microwaves) way. The computer-readable storage medium may be any available medium readable by a computer, or may be a data storage device such as a server and a data center integrated by one or more available mediums. The available medium may be such as a magnetic medium (e.g., a floppy disk, a hard disk, and a magnetic tape), an optical medium (e.g., a digital video disc (DVD)) or a semiconductor medium (e.g., a solid state disk).

The invention claimed is:

1. A method for wireless communication, comprising:
   receiving, by first User Equipment (UE) from a source network device, a switching command for indicating the first UE to switch from a source path to a target path, wherein the source path is a path between the first UE and the source network device, the target path is a path between the first UE and a target network device, and at least one of the source path or the target path is a relay path; and
   starting, by the first UE, performing at least one of sending uplink data or receiving downlink data on the target path in response to being triggered by the switching command or a first message, wherein the first message is sent from second UE to the first UE, and the second UE is relay UE on the relay path,
   wherein the second UE is relay UE on the target path, and the first message indicates at least one event of following: connection configuration between the second UE and the target network device is completed; or connection configuration between the second UE and the first UE is completed.

2. The method according to claim 1, wherein the second UE is relay UE on the source path, and the first message indicates at least one event of following:
   connection configuration between the second UE and the first UE is completed;
   connection release between the second UE and the first UE is completed;
   the second UE has sent to the source network device uplink data which was sent from the first UE to the source network device; or
   the second UE has sent to the first UE downlink data which was sent from the source network device to the first UE.

3. The method according to claim 1, wherein before starting, by the first UE, performing the at least one of sending the uplink data or receiving the downlink data on the target path, the method further comprises:
   establishing, by the first UE, a connection with a target device on the target path,
   wherein the target path is a relay path and the target device is relay UE on the target path; or the target path is a direct path between the first UE and the target network device and the target device is the target network device.

4. The method according to claim 3, wherein establishing, by the first UE, the connection with the target device on the target path comprises:
   establishing, by the first UE, a Radio Link Control (RLC) entity corresponding to the target path.

5. The method according to claim 1, wherein in response to being triggered by the switching command or the first message, performing, by a Packet Data Convergence Protocol (PDCP) entity of the first UE, a target operation,
   wherein the target operation comprises at least one of following:
   PDCP reconstruction;
   PDCP data restoration;
   PDCP reconfiguration; or
   switching a transmission path of PDCP data from the source path to the target path.

6. The method according to claim 5, wherein the PDCP reconfiguration is used for enabling the PDCP entity to support simultaneous data transmission on the source path and the target path.

7. The method according to claim 1, further comprising:
   stopping or continuing, by the first UE according to the switching command, at least one of sending uplink data or receiving downlink data on the source path.

8. The method according to claim 7, wherein stopping or continuing, by the first UE according to the switching command, the at least one of sending the uplink data or receiving the downlink data on the source path comprises:

releasing or reconstructing, by the first UE according to the switching command, a Radio Link Control (RLC) entity, corresponding to the source path, in the first UE.

9. The method according to claim 1, further comprising:

receiving, by the first UE, indication information from the target network device, wherein the indication information is used for indicating the first UE to release or reconstruct a Radio Link Control (RLC) entity, corresponding to the source path, in the first UE.

10. The method according to claim 1, further comprising:

if the first message indicates that the connection configuration between the first UE and the second UE is completed, sending, by the first UE, data to the second UE before the second UE establishes a connection with the target network device.

11. The method according to claim 1, further comprising:

if the first message indicates that the connection configuration between the second UE and the target network device is completed, sending, by the first UE, data to the second UE after the second UE establishes a connection with the target network device.

12. A method for wireless communication, comprising:

sending, by a source network device, a switching command to first User Equipment (UE), wherein the switching command is used for indicating the first UE to switch from a source path to a target path, the source path is a path between the first UE and the source network device, the target path is a path between the first UE and a target network device, at least one of the source path or the target path is a relay path, and the switching command is further used for triggering the first UE to start performing at least one of sending uplink data or receiving downlink data on the target path, wherein the switching command is used for triggering a Packet Data Convergence Protocol (PDCP) entity of the first UE to perform a first target operation, and the first target operation comprises at least one of:

PDCP reconstruction;

PDCP data restoration;

PDCP reconfiguration; or switching a transmission path of PDCP data from the source path to the target path.

13. The method according to claim 12, wherein the PDCP reconfiguration is used for enabling the PDCP entity to support simultaneous data transmission on the source path and the target path;

wherein the switching command is used for indicating the first UE to stop or continue at least one of sending uplink data or receiving downlink data on the source path.

14. A device for wireless communication, the device being first User Equipment (UE) and comprising:

a transceiver, configured to: receive, from a source network device, a switching command for indicating the first UE to switch from a source path to a target path, wherein the source path is a path between the first UE and the source network device, the target path is a path between the first UE and a target network device, and at least one of the source path or the target path is a relay path; and a processor, configured to: start performing at least one of sending uplink data or receiving downlink data on the target path in response to being triggered by the switching command or a first message, wherein the first message is sent from second UE to the first UE, and the second UE is relay UE on the relay path, wherein the second UE is relay UE on the target path, and the first message indicates at least one event of following: connection configuration between the second UE and the target network device is completed; or connection configuration between the second UE and the first UE is completed.

15. The device according to claim 14, wherein the second UE is relay UE on the source path, and the first message indicates at least one event of following:

connection configuration between the second UE and the first UE is completed;

connection release between the second UE and the first UE is completed;

the second UE has sent to the source network device uplink data which was sent from the first UE to the source network device; or the second UE has sent to the first UE downlink data which was sent from the source network device to the first UE.

16. The device according to claim 14, wherein the processor is further configured to establish a connection with a target device on the target path;

wherein the target path is a relay path and the target device is relay UE on the target path; or the target path is a direct path between the first UE and the target network device and the target device is the target network device;

wherein the processor is further configured to establish a Radio Link Control (RLC) entity corresponding to the target path.

17. The device according to claim 14, wherein the processor is further configured to: in response to being triggered by the switching command or the first message, perform a target operation by using a Packet Data Convergence Protocol (PDCP) entity, wherein the target operation comprises at least one of following:

PDCP reconstruction;

PDCP data restoration;

PDCP reconfiguration; or switching a transmission path of PDCP data from the source path to the target path.

18. The device according to claim 14, wherein the processor is further configured to:

stop or continue, according to the switching command, at least one of sending uplink data or receiving downlink data on the source path.

19. The device according to claim 18, wherein the processor is further configured to:

release or reconstruct, according to the switching command, a Radio Link Control (RLC) entity, corresponding to the source path, in the first UE.

20. The device according to claim 14, wherein the transceiver is further configured to:

receive indication information from the target network device, wherein the indication information is used for indicating the first UE to release or reconstruct a Radio Link Control (RLC) entity, corresponding to the source path, in the first UE.

* * * * *